United States Patent
Fan et al.

(10) Patent No.: US 10,947,116 B2
(45) Date of Patent: Mar. 16, 2021

(54) METHOD TO SYNTHESIZE NANOPARTICLE SUPERCRYSTALS

(71) Applicant: National Technology & Engineering Solutions of Sandia, LLC, Albuquerque, NM (US)

(72) Inventors: Hongyou Fan, Albuquerque, NM (US); Kaifu Bian, Beaverton, OR (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 148 days.

(21) Appl. No.: 16/247,747

(22) Filed: Jan. 15, 2019

(65) Prior Publication Data
US 2020/0223694 A1 Jul. 16, 2020

(51) Int. Cl.
| | | |
|---|---|---|
| *C01B 19/00* | (2006.01) | |
| *C01G 21/21* | (2006.01) | |
| *C01G 49/08* | (2006.01) | |
| *B22F 9/16* | (2006.01) | |

(52) U.S. Cl.
CPC .............. *C01B 19/007* (2013.01); *B22F 9/16* (2013.01); *C01G 21/21* (2013.01); *C01G 49/08* (2013.01); *B22F 2301/255* (2013.01); *B22F 2304/10* (2013.01); *C01P 2002/76* (2013.01); *C01P 2004/61* (2013.01); *C01P 2006/40* (2013.01); *C01P 2006/42* (2013.01)

(58) Field of Classification Search
CPC ...... C01B 19/007; C01G 21/21; C01G 49/08; B22F 9/16; B22F 2301/255; B22F 2304/10; C01P 2002/76; C01P 2004/61; C01P 2006/40; C01P 2006/42
See application file for complete search history.

(56) References Cited

PUBLICATIONS

Gravelsins, Steven, and Al-Amin Dhirani. "A rapid, high yield size-selective precipitation method for generating Au nanoparticles in organic solvents with tunably monodisperse size distributions and replaceable ligands." RSC advances 7.88 (2017): 55830-55834.*

Garcia-Barrasa, J., et al. "Synthesis of thiolate-protected silver nanocrystal superlattices from an organometallic precursor and formation of molecular di-n-alkyldisulfide lamellar phases." Journal of Nanoparticle Research 13.2 (2011): 791-801.*

Bao, Shixiong, et al. "Understanding the formation of pentagonal cyclic twinned crystal from the solvent dependent assembly of Au nanocrystals into their colloidal crystals." The Journal of Physical Chemistry Letters 4.20 (2013): 3440-3444.*

(Continued)

*Primary Examiner* — Richard M Rump
(74) *Attorney, Agent, or Firm* — Kevin W. Bieg

(57) ABSTRACT

Highly ordered arrays of 3D faceted nanoparticle supercrystals are formed by self-assembly with controlled nanoparticle packing and unique facet dependent optical property by using a binary solvent diffusion method. The binary diffusion results in supercrystals whose size and quality are determined by initial nanoparticle concentration and diffusion speed. The supercrystal solids display unique facet-dependent surface plasmonic and surface-enhanced Raman characteristics. The supercrystals have potential applications in areas such as optics, electronics, and sensor platforms.

18 Claims, 7 Drawing Sheets

(56) References Cited

PUBLICATIONS

Bian, Kaifu, Ruipeng Li, and Hongyou Fan. "Controlled self-assembly and tuning of large PbS nanoparticle supercrystals." Chemistry of Materials 30.19 (2018): 6788-6793.*

Wang, Z. et al., "Correlating Superlattice Polymorphs to Internanoparticle Distance, Packing Density, and Surface Lattice in Assemblies of PbS Nanoparticles", Nano Letters, 2013, pp. 1303-1311, vol. 13.

Talapin, D. V. et al., "A New Approach to Crystallization of CdSe Nanoparticles into Ordered Three-Dimensional Superlattices", Advanced Materials, 2001, pp. 1868-1871, vol. 13.

Murray, C. B. et al., "Synthesis and Characterization of Monodisperse Nanocrystals and Close-Packed Nanocrystal Assemblies", Annual Reviews Materials Science, 2000, pp. 545-610, vol. 30.

Li, R. et al., An Obtuse Rhombohedral Superlattice Assembled by Pt Nanocubes, Nano Letters, 2015, pp. 6254-6260, vol. 15.

Li, R. et al., "Decoding the Superlattice and Interface Structure of Truncate PbS Nanocrystal-Assembled Supercrystal and Associated Interaction Forces", Journal of the American Chemical Society, 2014, pp. 12047-12055, vol. 136.

Choi, J. J. et al., "Interface-Induced Nucleation, Orientational Alignment and Symmetry Transformations in Nanocube Superlattices", Nano Letters, 2012, pp. 4791-4798, vol. 12.

Bian, K. et al., "Shape-Anisotropy Driven Symmetry Transformations in Nanocrystal Superlattice Polymorphs", ACS Nano, 2011, pp. 2815-2823. vol. 5.

Bian, K. et al., "Comparing the Structural Stability of PbS Nanocrystals Assembled in fcc and bcc Superlattice Allotropes", Journal of the American Chemical Society, 2012, pp. 10787-10790, vol. 134.

Collier, C. P. et al., "Reversible Tuning of Silver Quantum Dot Monolayers Through the Metal-Insulator Transition", Science, New Series, 1997, pp. 1978-1981, vol. 277.

Wang, C. et al., "Understanding the Forces Acting in Self-Assembly and the Implications for Constructing Three-Dimensional (3D) Supercrystals", Nano Research, 2015, pp. 2445-2466, vol. 8.

Kim, J. et al., "Polymorphic Assembly from Beveled Gold Triangular Nanoprisms", Nano Letters, 2017, pp. 3270-3275, vol. 17.

Kim, J. et al., "Imaging the Polymerization of Multivalent Nanoparticles in Solution", Nature Communication, 2017, vol. 8, No. 761, 10 pages.

Quan, Z. et al., "Solvent-Mediated Self-Assembly of Nanocube Superlattices", Journal of the American Chemical Society, 2014, pp. 1352-1359, vol. 136.

Choi, J. J. et al., "Controlling Nanocrystal Superlattice Symmetry and Shape-Anisotropic Interactions through Variable Ligand Surface Coverage", Journal of the American Chemical Society, 2011, pp. 3131-3138, vol. 133.

Weidman, M. C. et al., "Kinetics of the Self-Assembly of Nanocrystal Superlattices Measured by Real-Time in Situ X-Ray Scattering", Nature Materials, 2016. pp. 775-781, vol. 15.

Podsiadlo, P. et al., "High-Pressure Structural Stability and Elasticity of Supercrystals Self-Assembled from Nanocrystals", Nano Letters, 2011, pp. 579-588, vol. 11.

Chiu, C.-Y. et al., "Surfactant-Directed Fabrication of Supercrystals from the Assembly of Polyhedral Au-Pd Core-Shell Nanocrystals and Their Electrical and Optical Properties", Journal of the American Chemical Society, 2015, pp. 2265-2275, vol. 137.

Zheng, N. et al., "One-Step One-Phase Synthesis of Monodisperse Noble-Metallic Nanoparticles Their Colloidal Crystals", Journal of the American Chemical Society, 2006, pp. 6550-6551, vol. 128.

Shevchenko, E. et al., "Colloidal Crystals of Monodisperse FePt Nanoparticles Grown by a Three-Layer Technique of Controlled Oversaturation", Advanced Materials, 2002, pp. 287-290, vol. 14.

Rupich, S. M. et al., "Size-Dependent Multiple Twinning in Nanocrystal Superlattices", Journal of the American Chemical Society, 2010, pp. 289-296, vol. 132.

Savira, J. A., "Current Trends in Protein Crystallization", Archives of Biochemistry and Biophysics, 2016, pp. 3-11, vol. 602.

Bian, K. et al., "Formation of Self-Assembled Gold Nanoparticle Supercrystals with Facet-Dependent Surface Plasmonic Coupling", Nature Communications, 2018, vol. 9, No. 2365, 7 pages.

\* cited by examiner

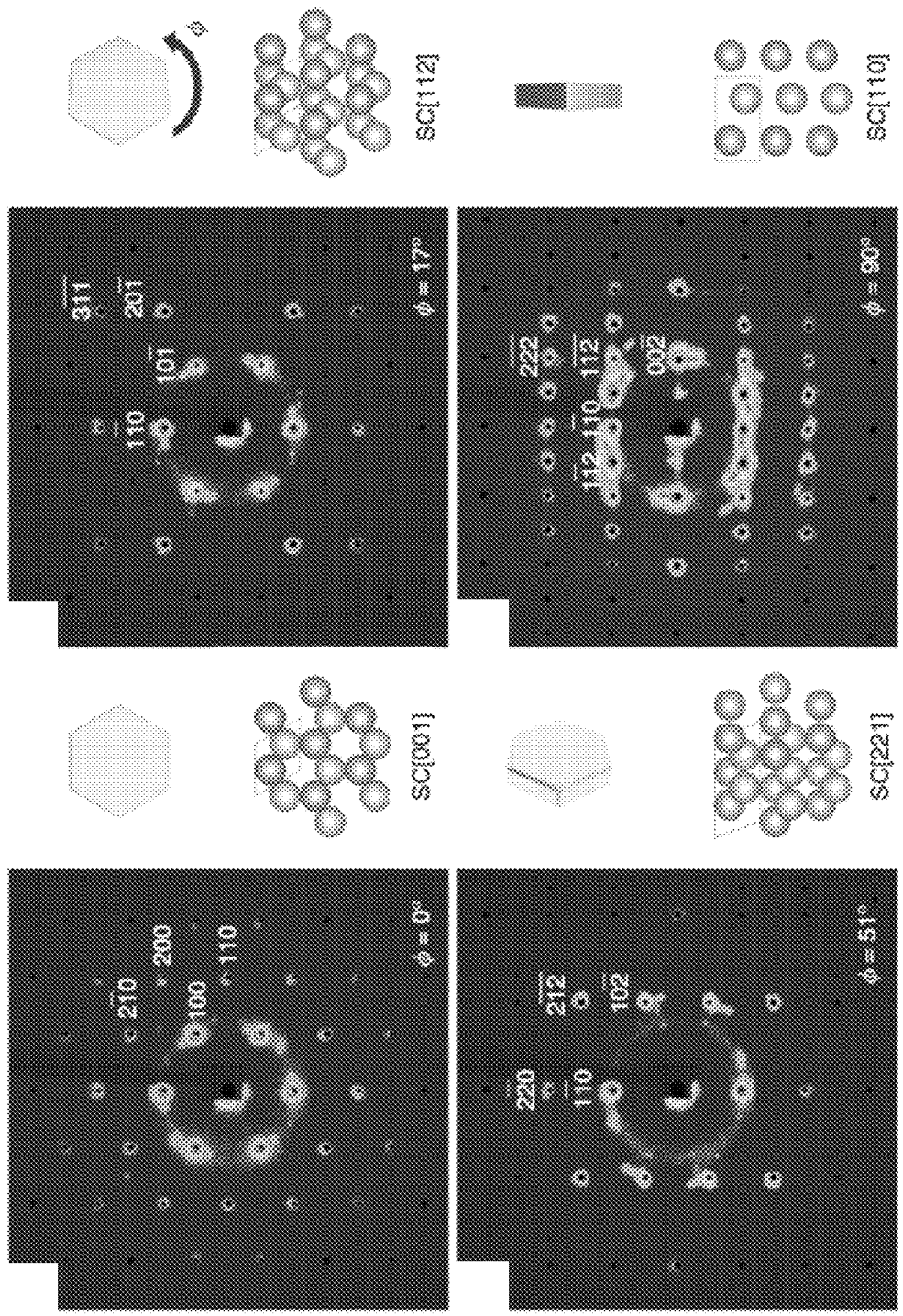

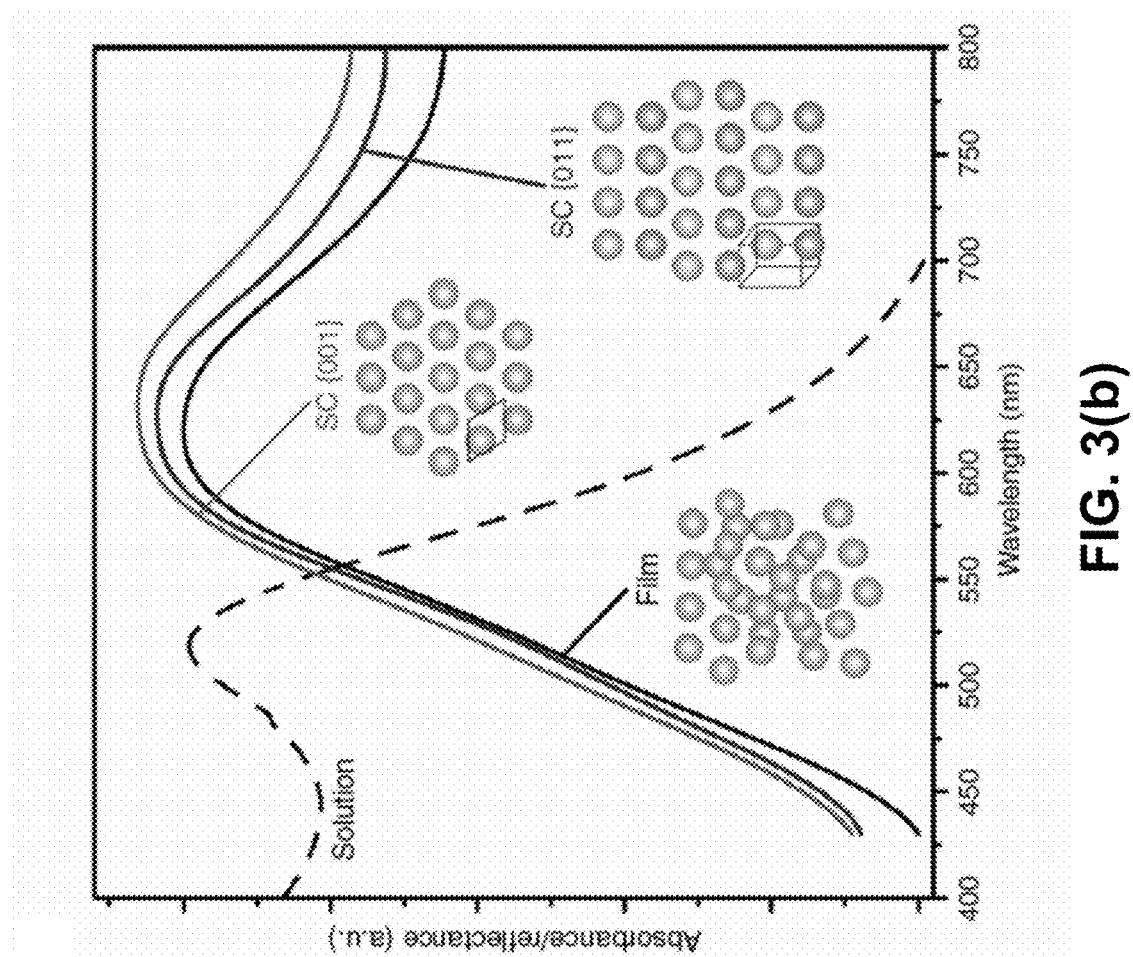
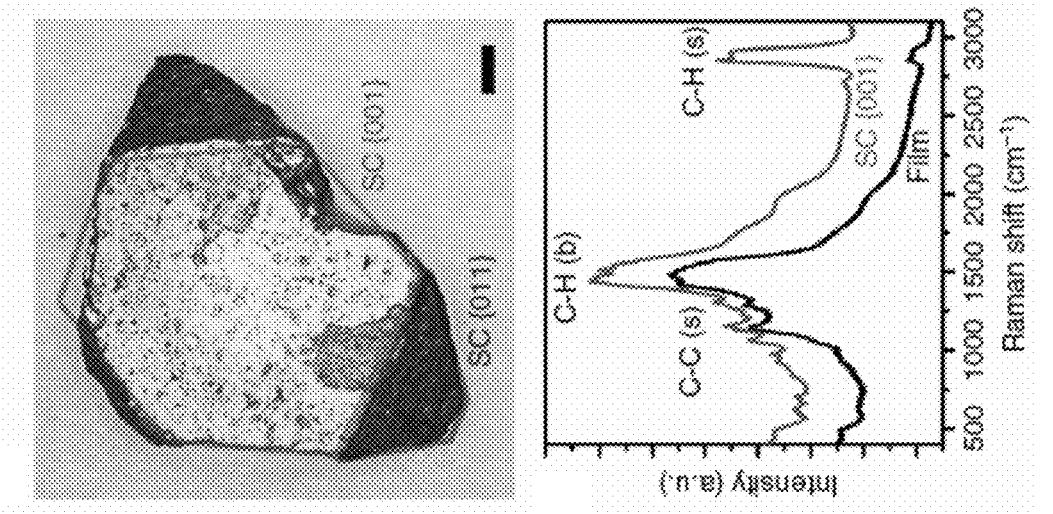
FIG. 3(a)
FIG. 3(b)
FIG. 3(c)

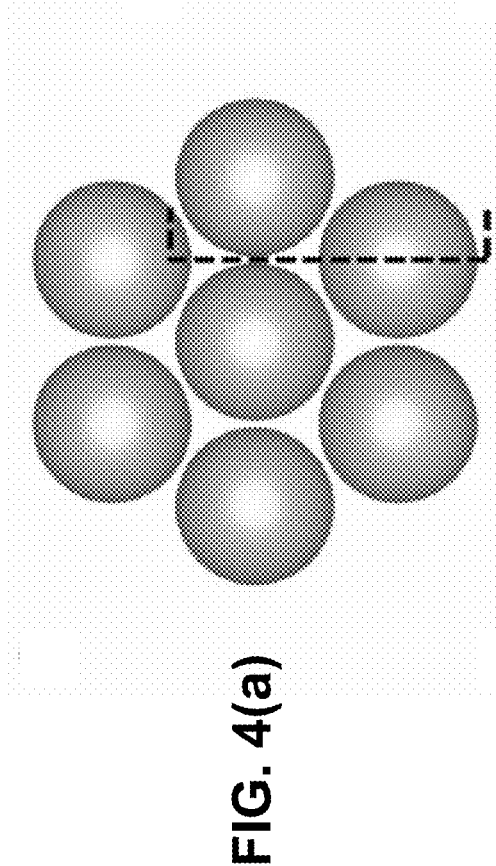
FIG. 4(a)
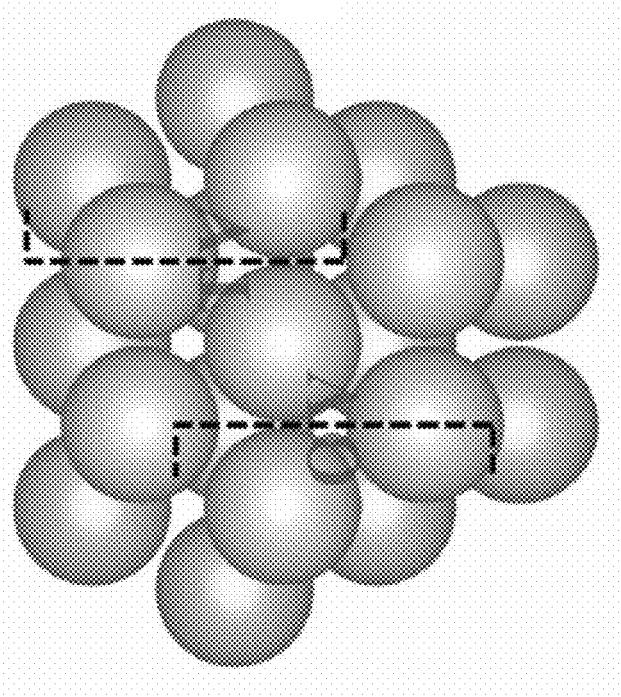
FIG. 4(c)
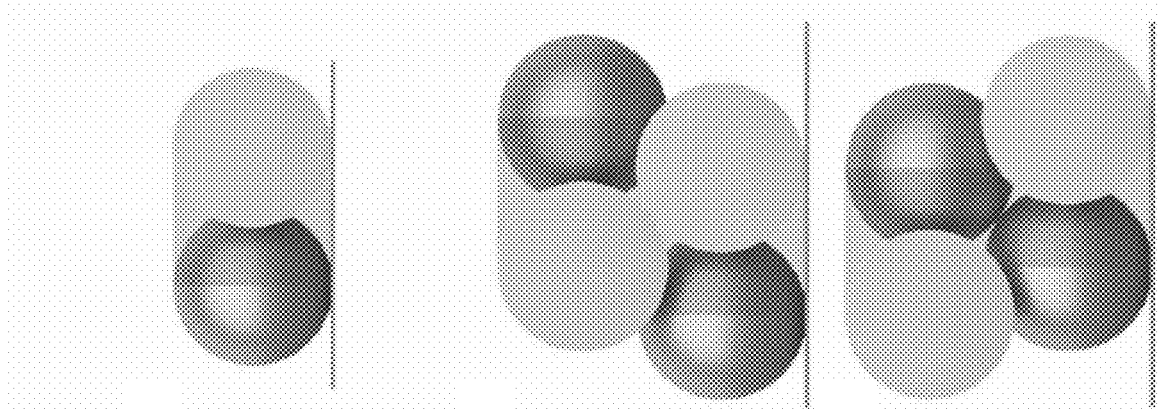
FIG. 4(b)
FIG. 4(d)
FIG. 4(e)

METHOD TO SYNTHESIZE NANOPARTICLE SUPERCRYSTALS

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention is related to nanoparticles and, in particular, to a method to synthesize nanoparticle supercrystals.

BACKGROUND OF THE INVENTION

Metallic and semiconductor nanoparticles (NPs) have been widely researched for their ability to self-assemble into ordered supercrystals (SCs). See Z. Wang et al., *Nano Lett.* 13, 1303 (2013); D. V. Talapin et al., *Adv. Mater.* 13, 1868 (2001); C. B. Murray et al., *Annu. Rev. Mater. Sci.* 30, 545 (2000); R. Li et al., *Nano Lett.* 15, 6254 (2015); R. Li et al., *J. Am. Chem. Soc.* 136, 12047 (2014); J. J. Choi et al., *Nano Lett.* 12, 4791 (2012); and K. Bian et al., *ACS Nano* 5, 2815 (2011). These SCs display not only the intrinsic characteristics which belong to individual NP building blocks but also unique collective optical, electronic, and mechanical properties which are tunable by their mesostructure. See K. Bian et al., *J. Am. Chem. Soc.* 134, 10787 (2012); and C. P. Collier et al., *Science* 277, 1978 (1997). The self-assembly of NPs is a complex process which involves numerous interactions including van der Waals attraction, Coulombic and magnetic forces, steric repulsion, and capillary forces. See C. Wang et al., *Nano Res.* 8, 2445 (2015); J. Kim et al., *Nano Lett.* 17, 3270 (2017); and J. Kim et al., *Nat. Commun.* 8, 761 (2017). By tuning these interactions, the SC morphology can be controlled. See Z. Wang et al., *Nano Lett.* 13, 1303 (2013); K. Bian et al., *ACS Nano* 5, 2815 (2011); Z. Quan et al., *J. Am. Chem. Soc.* 136, 1352 (2014); J. J. Choi et al., *J. Am. Chem. Soc.* 133, 3131 (2011); and M. C. Weidman et al., *Nat. Mater.* 15, 775 (2016). Highly ordered single SCs are potentially a key to understanding complex chemical and physical processes such as optoelectronic coupling, surface plasmon-based sensing, and pressure-induced interparticle coalescence. See J. Kim et al., *Nano Lett.* 17, 3270 (2017); J. Kim et al., *Nat. Commun.* 8, 761 (2017); H. Wu et al., *J. Am. Chem. Soc.* 132, 12826 (2010); H. Wu et al., *Angew. Chem. Int. Ed.* 49, 8431 (2010); and B. Li et al., *Nat. Commun.* 5, 4179 (2014). Previously, the largest SCs were reported to be only tens of micrometers. See R. Li et al., *Nano Lett.* 15, 6254 (2015); C. Wang et al., *Nano Res.* 8, 2445 (2015); P. Podsiadlo et al., *Nano Lett.* 11, 579 (2011); and C.-Y. Chiu et al., *J. Am. Chem. Soc.* 137, 2265 (2015). However, large defect-free SCs are required for device integration.

SUMMARY OF THE INVENTION

The present invention is directed to the synthesis of SCs with sub-millimeter size that are prepared from ligand-capped nanoparticles by a counter-diffusion method. A NP solution is slowly driven to supersaturation by increasing anti-solvent concentration, resulting in heterogeneous SC growth. The size and quality of the SCs is determined by initial NP concentration and diffusion speed.

BRIEF DESCRIPTION OF THE DRAWINGS

The detailed description will refer to the following drawings, wherein like elements are referred to by like numbers.

FIG. 1(*a*) is a TEM image of the synthesized gold NPs. Scale bar is 10 nm. Inset shows statistics of the particle diameter. FIG. 1(*b*) is a SEM image of a SC. Scale bar is 5 µm. FIG. 1(*c*) is a high-resolution SEM image of the top surface of the SC showing hexagonal packing. Scale bar is 50 nm. Inset shows the corresponding FFT pattern FIGS. 2(*a*)-(*g*) show super-crystallography analysis of a single gold SC at varying rotational angle phi ($\phi$)). FIG. 2(*g*) is an integrated azimuthal WAXS spectra of the Au (111) peak. The sharp dips were caused by beam-stop blockage.

FIGS. 3(*a*)-(*c*) show large gold SC of sub-millimeter size and optical characteristics. FIG. 3(*a*) is a photograph of a gold SC measured 490 µm. Scale bar is 50 µm. The blue and red frame outline SC {011} and SC {001} surface, respectively. FIG. 3(*b*) is an optical reflectance spectra (normalized) collected from two different facets (blue and red) of the SC and a drop-cast film (black solid line) and absorption from the NP solution (black dashed line). FIG. 3(*c*) shows anti-Stokes Raman spectra of dodecanethiol ligand collected from the surface of SC (red) and film (black). The peaks are labeled with corresponding vibration modes with (s)=stretching and (b)=bending.

FIGS. 4(*a*)-(*e*) are schematic illustrations of the early stage of the SC growth. FIG. 4(*a*) is an illustration of the first hexagonal monolayer of NPs. FIG. 4(*b*) is a cross-section as marked by dashed line in FIG. 4(*a*). FIG. 4(*c*) is an illustration of two consecutive monolayers and cross-sections showing a tetragonal void (TV) is FIG. 4(*d*) and an octahedral void (OV) in FIG. 4(*e*). The red shades outline the free space in these voids.

FIG. 6(*a*) is a graph for slow diffusion. FIG. 6(*b*) as a graph for fast diffusion. The corresponding schematics on the side illustrate the initial configuration of the liquid column (purple: gold NPs in toluene; blue: IPA). FIG. 6(*c*) is a graph of spatial distribution of diffusion speed when $x_{IPA}$ reached 0.1.

DETAILED DESCRIPTION OF THE INVENTION

The present invention is directed to a method to synthesize nanoparticle supercrystals, comprising providing a colloidal suspension of ligand-capped nanoparticles in a non-polar solvent, and counter-diffusing the non-polar solvent and the polar anti-solvent into each other, thereby slowly precipitating nanoparticle supercrystals. The nanoparticles comprise metal, semiconductor, or magnetic nanoparticles, such as Ag, CdSe, PbS, PbSe, FePt, or $Fe_3O_4$ nanoparticles. The ligand can comprise an alkyl thiol, an alkyl amine, or an alkyl acid. For example, the non-polar solvent comprises toluene, hexane, benzene, or xylene. For example, the polar anti-solvent comprises isopropanol, ethanol, methanol, or tetrahydrofuran. The supercrystals can be greater than one micrometer in size, preferably greater than ten micrometers in size, and more preferably greater than one hundred micrometers in size.

As an example of the invention, dodecanethiol-capped gold NPs were synthesized using a one-step oil-phase method and dispersed in toluene. See N. Zheng et al., *J. Am. Chem. Soc.* 128, 6550 (2006). The synthesis was carried out by mixing the metal precursor, $AuPPh_3Cl$, with dodecanethiol as the capping ligand in toluene. A reducing agent, tert-butylamine-borane complex, was then added. The mixture was left to stir for 24 h at room temperature. The raw product, which was dark purple in color, was washed twice in ethanol, filtered and redispersed in toluene for characterization. As shown by the transmission electron microscopy (TEM) image in FIG. 1(a), the product spherical gold NPs had an average diameter of 4.4 nm and standard deviation of 8%.

Figures 1A, 1B, 1C:
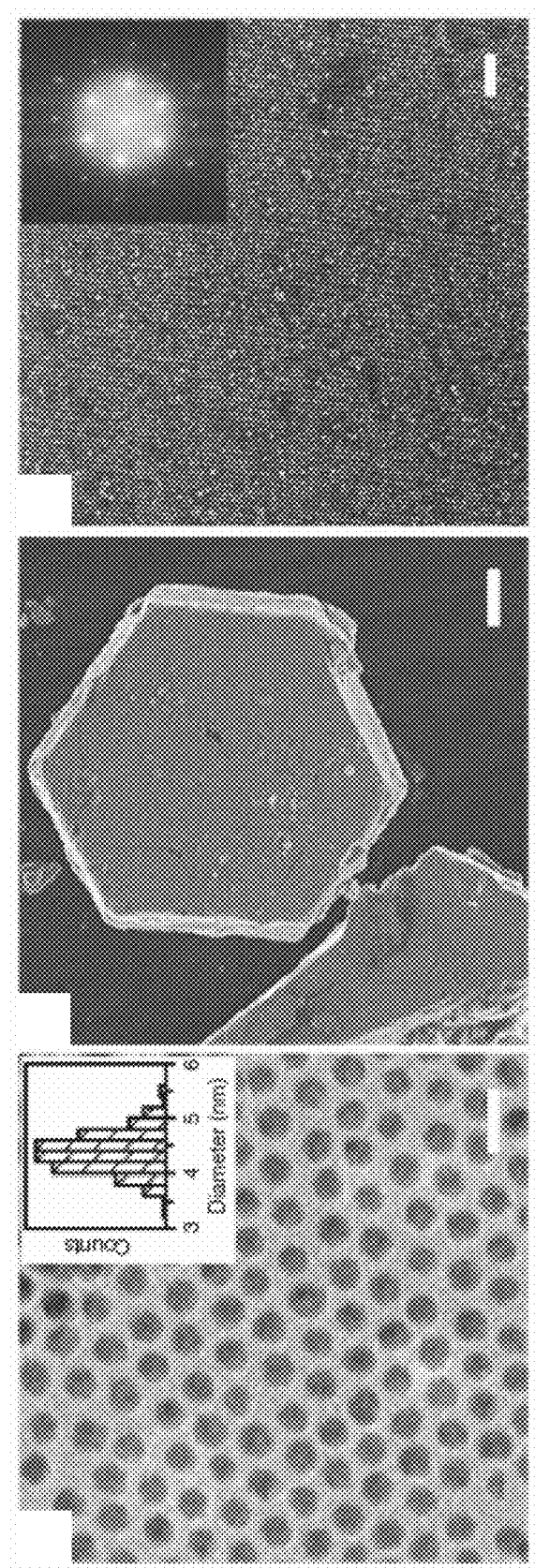
FIGS. 1(*a*)-(*c*) show electron microscopy characterizations of gold NPs and SCs.

SCs were then grown by a counter-diffusion method that can produce SCs of various NP species. See D. V. Talapin et al., *Adv. Mater.* 13, 1868 (2001); P. Podsiadlo et al., *Nano Lett.* 11, 579 (2011); E. Shevchenko et al., *Adv. Mater.* 14, 287 (2002); and S. M. Rupich et al., *J. Am. Chem. Soc.* 2010, 289 (2010). The crystallization of gold NPs took place in vertically positioned glass test tubes (~13 cm). In a typical growth, a test tube was first filled with a colloidal solution of gold NPs in toluene of varying concentrations. Anti-solvent isopropanol (IPA) was added on top of the toluene solution of dodecanethiol-capped gold NPs with a volumetric ratio of IPA/toluene=4:1, forming a liquid-liquid interface between the two solvents. The total height of the liquid was either ~56 or 120 mm for fast and slow diffusion, respectively. The tubes were left undisturbed as the solvents were allowed to counter-diffuse into each other, indicated by a blurring interface. As the IPA concentration increased in the NP phase, gold NPs became over saturated and slowly precipitated. The growth was considered complete when the interface disappeared and the mixture became homogeneous and colorless. The process took approximately 1 week. The product SCs were collected by removing the liquid and rinsed by and then stored in ethanol. As shown in FIG. 1(b), the product SCs displayed a highly faceted hexagonal disk shape with size up to tens of micrometers. A hexagonal packing of the constituent NPs was confirmed by high-resolution scanning electron microscopy (SEM) image of the SC surface, shown in FIG. 1(c), which revealed a nearly perfect hexagonal close-packing array. The corresponding fast Fourier transform (FFT) pattern shows clear second-order peaks, evidencing the long-range translational ordering, and suggested a single SC, i.e., each grain containing only one crystal domain.

Structural Characterization by X-Ray Scattering Super-Crystallography

Figures 2E, 2F:
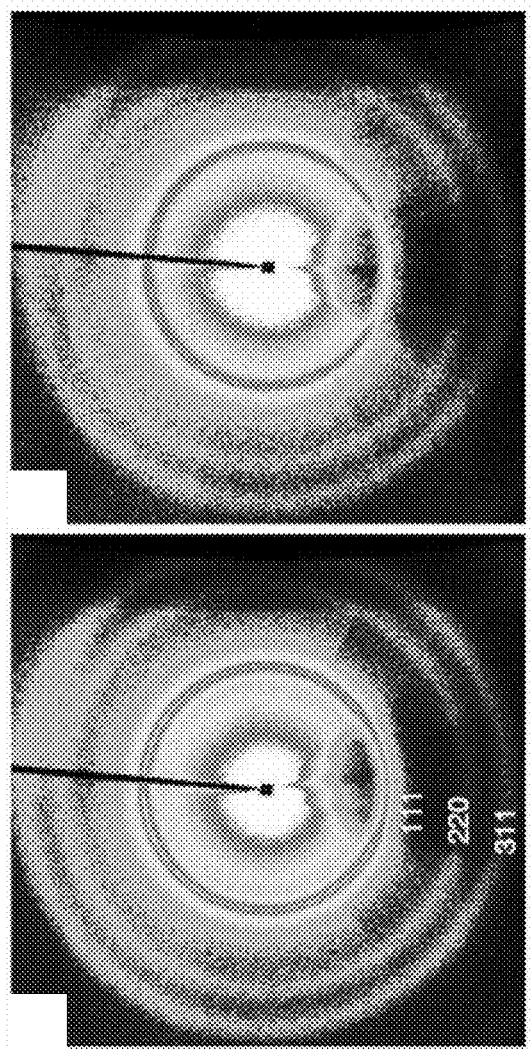
FIGS. 2(*a*)-(*d*) are SAXS patterns in selected projections. Simulated peaks (black dots) from an hcp superlattice are overlaid on top of experimental patterns with Miller indices labeled. Insets of FIGS. 2(*a*)-(*d*) present corresponding schematic illustrations of a rotating SC with X-ray beam shooting perpendicular to paper and an hcp superlattice in the same projections as labeled by SC [hkl]. Three consecutive hexagonal monolayers are shown in two different colors to emphasize the ABA packing for visual aid. WAXS patterns from the same SC with FIG. 2(*e*) $\phi=0°$ and FIG. 2(*f*) $\phi=90°$, collected simultaneously with the SAXS patterns in FIGS. 2(*a*) and 2(*d*), respectively. Powder scattering rings from gold atomic lattice are marked with Miller indices.
Figure 2G:
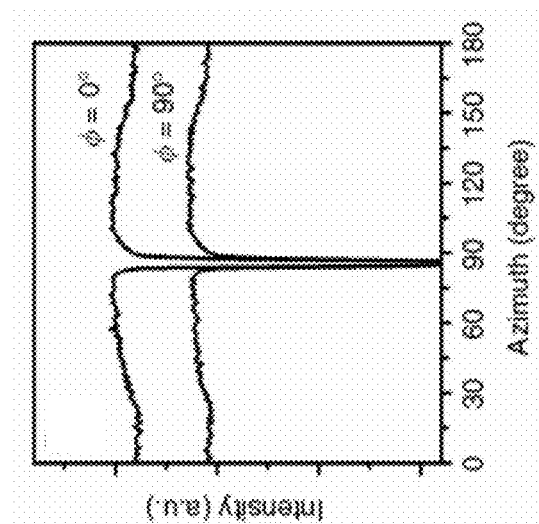

To decode the three-dimensional (3D) structure in the gold SCs, they were characterized by a recently developed super-crystallography technique. See R. Li et al., *Nano Lett.* 15, 6254 (2015). Comprehensive sets of SAXS and WAXS images were collected from a SC rotating around one of its high symmetry axes $\phi$. The abundant SAXS and WAXS data were analyzed to provide structure information at meso- and atomic scales, respectively. FIGS. 2(a)-(d) show the representative SAXS patterns. Sharp and multiple-ordered peaks confirm long-range translational order, consistent with the SEM images. These peaks were indexed to a single hcp superlattice (insets of FIGS. 2(a)-(d)). An additional set of SAXS patterns (not shown) were collected from the same SC with a different rotation axis 30° apart to unambiguously confirm the symmetry. The hcp lattice parameters were measured as a=b=6.7 nm, c=10.9 nm, and $\alpha=\beta=120°, \gamma=90°$. The separation between nearest neighbor NPs was 2.3 nm, shorter than twice the length of a free dodecanethiol ligand (1.8 nm). This indicates interdigitation between ligands so as to lower enthalpy via ligand-ligand van der Waals attraction. See Z. Wang et al., *Nano Lett.* 13, 1303 (2013); R. Li et al., *J. Am. Chem. Soc.* 136, 12047 (2014); and U. Landman and W. D. Luedtke, *Faraday Discuss.* 125,1 (2004). With such short interparticle separation, the interstitial voids in the hcp superlattice were mostly occupied by the ligands. In addition to translational symmetry, the orientation of the gold NPs in the SC was simultaneously measured by WAXS. FIGS. 2(e) and 2(f) show the WAXS patterns 90° apart. In both cases, as clarified by the integrated scattering intensity as a function of azimuthal angle, shown in FIG. 2(g), continuous powder scattering rings were observed, indicating randomly oriented NPs. The lack of orientational order suggests isotropic interparticle interactions, which agrees with the spherical particle shape.

Influence of Nanoparticle Concentration and Diffusion Speed

To optimize the diffusion-induced growth and further improve the size and quality of the gold SCs, a series of crystallization experiments were conducted under various conditions. The influence of initial NP concentration $C_{NP,0}$ was explored by growing SCs from solutions with $C_{NP,0}=2$, 4, and 8 mg/mL. As $C_{NP,0}$ increased from 2 to 8 mg/mL, the average size was increased and the uniformity of the SCs was improved as well. In addition, the size of the largest observed SCs doubled from ~23 μm to ~41 μm. It can be intuitively explained by the fact that higher $C_{NP,0}$ provides more NPs as building materials for larger SCs. The effect of diffusion speed was also investigated by doubling the height of the liquid column to slow down the counter-diffusion process from approximately 1 week to 1 month. In this case $C_{NP,0}$ was maintained at 8 mg/mL for consistency. Slow diffusion resulted in noticeably larger SCs. The average SC size increased from 23 μm to 37 μm while the maximum size almost doubled from 41 μm to 79 μm. Further, the total quantity of the gold NPs in this scenario was doubled due to increased volume of the NP solution. Assuming the diffusion speed was irrelevant to the SC growth, an average SC size of 23 μm×$^3\sqrt{2}$=29 μm was expected, 28% smaller than the experimental value of 37 μm. Therefore, it can be concluded that lower diffusion speed contributed to larger SCs in addition to $C_{NP,0}$. Upon identification of the two key factors determining the size and quality of SCs, the growth was further optimized to be carried out in a capillary tube and with a very high $C_{NP,0}=25$ mg/m L. The capillary tube, with an inner diameter of only 2 mm, significantly lengthen the diffusion duration from about 1 month to 3 months due to enhanced surface tension/boundary effect and minimized perturbation. As shown in FIG. 3(a), gold SCs with well-defined facets and a record large size up to 0.5 mm, equivalent to ~7.5×10$^4$ unit cells, were obtained.

Surface Plasmon Resonance in Sub-Millimeter Gold Super-Crystals

Large SCs enable easy transfer, manipulation, and characterization, thus enabling the study of collective properties of the NPs in the ordered arrays. Optical reflectance spectra were collected from two different facets of the SC shown in FIG. 3(a) and compared to that from a drop-casted gold NP film, as a reference, to explore the relationship between NP packing structure and surface plasmon behavior. The reference film was prepared by drop-casting gold NPs on a glass slide then drying quickly, resulting in an amorphous meso-structure as confirmed by the SAXS pattern. As shown in FIG. 3(b) and summarized in Table 1, the plasmon resonance peak shifted between the samples, indicating different degrees of coupling effect. As another demonstration, the Raman spectrum of the dodecanethiol ligand was collected from the SC {001} surface and compared to the reference film, as shown in FIG. 3(c). Three major vibration modes were identified, including C—C stretching (1145 cm$^{-1}$), C—H bending (1475 cm$^{-1}$), and C—H stretching (2880 cm$^{-1}$). The absence of S—C stretching (~650 cm$^{-1}$) and S—H stretching (~2580 cm$^{-1}$) peaks confirms grafting of dodecanethiols on the gold NP surface. It was also observed that the C—H (s) peak was significantly strengthened at the SC surface due to SERS effect, by approximately 9 times with respect to the gold NP film reference. This peak at 2880 cm$^{-1}$ corresponds to an anti-Stokes scattered photon with absolute energy of 1.95 eV or 635 nm (shifted from 780 nm incident photon) which is close to the plasmonic peak at 631.5 nm of SC {001}. The improved SERS was attributed to strongly coupled electric field by the highly ordered SC.

TABLE 1

Plasmon peak position and width of gold SC

| Sample | Peak center (nm) | HWHM (nm) |
|---|---|---|
| Solution | 528.7 | 63.5 |
| Film | 620.4 | 73.4 |
| SC {011} | 627.3 | 73.6 |
| SC {001} | 631.5 | 83.0 |

Hexagonal Close Packed (Hcp) Packing of Nanoparticles

The combined results of electron microscopy and X-ray scattering confirm the successful growth of large gold SCs of sub-millimeter size with hcp mesostructure. A 3D hexagonal packing of spherical particles can be achieved by either fcc or hcp lattice. Both consist of the identical hexagonal monolayers with the only difference being the stacking arrangement of ABCA vs. ABAB. For hard spheres, fcc offers a slightly higher translational entropy than hcp by a margin of only ~0.001k$_B$T per particle, too small to dominantly affect packing morphology. See L. V. Woodcock, Nature 385, 141 (1997); P. G. Bolhuis, Nature 388, 235 (1997); and S. C. Mau and D. A. Huse, Phys. Rev. E 59, 4396 (1999). Therefore, a random hcp configuration, e.g. ABACB, is often observed with colloidal particles. With the synthesis of the present invention, gold NP assembled into hcp SCs exclusively. This exclusivity is attributed to the role of ligands that has been reported to be critical in determining structures in NP superlattices. See K. Bian et al., ACS Nano 5, 2815 (2011); C. Wang et al., Nano Res. 8, 2445 (2015); Z. Quan et al., J. Am. Chem. Soc. 136, 1352 (2014); and J. J. Choi et al., J. Am. Chem. Soc. 133, 3131 (2011). The disk shape of SCs and their preference to attach to a substrate suggests a heterogeneous layer-by-layer growth. The SC formation begins with a first hexagonal mono-layer, shown as golden spheres in FIGS. 4(a) and 4(b), that serves as the foundation for further growth. The second NP layer (blue spheres), as shown in FIG. 4(c), prefers to attach on top of the first layer at the identical triangular void sites to maximize nearest neighbor contacts due to strong ligand-ligand attractions. When adding the third layer there are two options, namely tetragonal voids (TVs) and octahedral voids (OVs), as illustrated in FIGS. 4(c)-(e), leading to hcp and fcc, respectively. Two reasons may contribute to the dominance of TV sites, leading to the hcp lattice, in the gold SCs. On one hand, as the NP continues to stack into the hcp superlattice, the OVs connect to form tunnels penetrating the entire SC. These tunnels provide space for ligand and solvent molecules, resulting in higher entropy in them. See N. A. Mahynski et al., Nat. Commun. 5, 4472 (2014). On the other hand, the relatively hollow OV tunnels tolerate more anti-solvent molecules than the TV sites, which are mostly occupied by ligand molecules. Therefore, an incoming NP will avoid the thermodynamically less preferred OVs according to Flory-Huggins theory and attach to the TVs to minimize energy by ligand interdigitation.

Counter-Diffusion Phase Diagram

Figure 5:
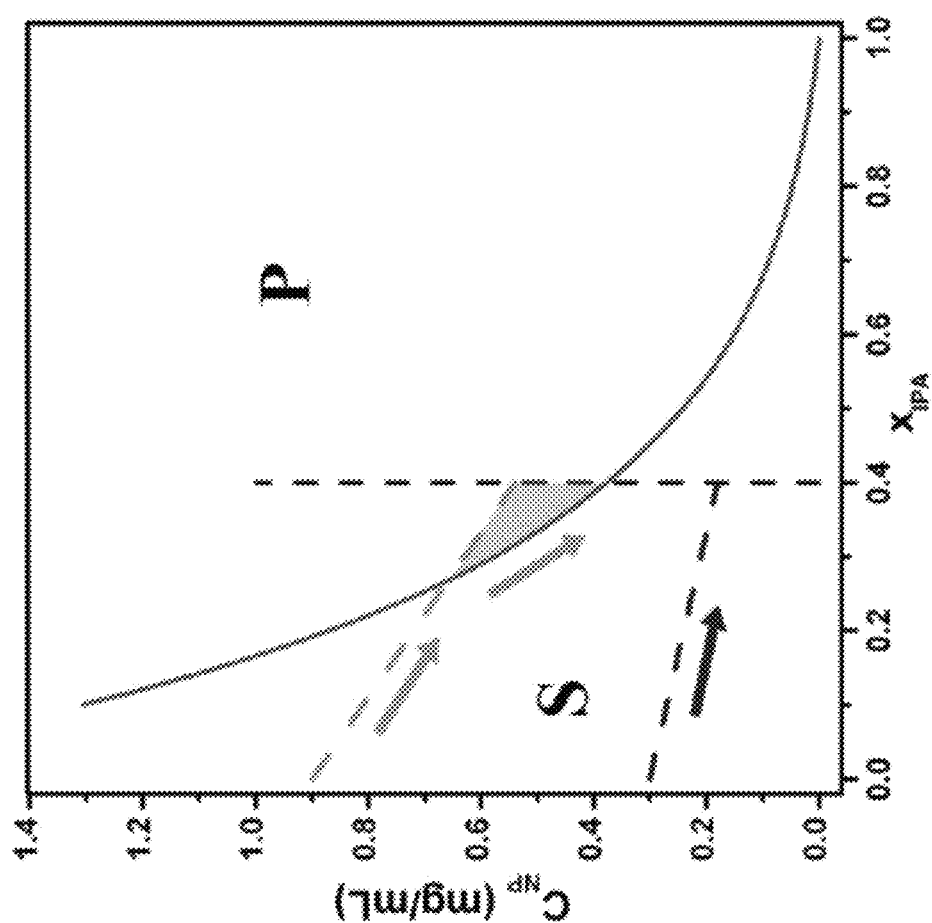
FIG. 5 shows a phase diagram of solubility of gold NPs in a toluene-IPA solvent mixture.

The gold NP solution is driven to a state of supersaturation by counter-diffusion and then the free energy gained is released by the formation of precipitate. See J. A. Gavira, Arch. Biochem. Biophys. 602, 3 (2016). The size and quality of SCs were also found to relate to the initial NP concentration $C_{NP,0}$ and the diffusion speed. To obtain insights, the solubility of NPs and the diffusion process were quantitatively analyzed. The solubility of gold NPs $C_{NP}$ in toluene/IPA mixture was experimentally measured as a function of the volume fraction of IPA, $x_{IPA}$. For visual aid and computational convenience, the data were fitted to an exponential solubility curve $C_{NP}=2.0e^{-3.9xIPA}-0.040$. This curve divided the phase diagram into two regimes, S and P, as shown in FIG. 5. In regime S, the NPs are soluble, and precipitate when the system enters regime P. The phase diagram was verified with a pair of experiments with initial NP concentration $C_{NP,0}$ of 0.3 and 0.9 mg/m L. The arrows show the dilution paths of gold solution in the two experiments. In the case of lower $C_{NP,0}$ (blue path), the system remains in regime S and no precipitation is expected. In contrast, in the higher concentration case the dilution line (green path) intercepts the solubility curve and enters regime P to predict precipitation of quantity proportional to the enclosed area (green shade). These predictions were then confirmed by optical microscopy images. Higher $C_{NP,0}$ results in a larger enclosed area in the diagram meaning greater quantity of NP precipitation and larger SCs. Such a phase diagram provides an important guide for the optimization of SC growth.

Simulation of Counter-Diffusion Process

Figure 6A:
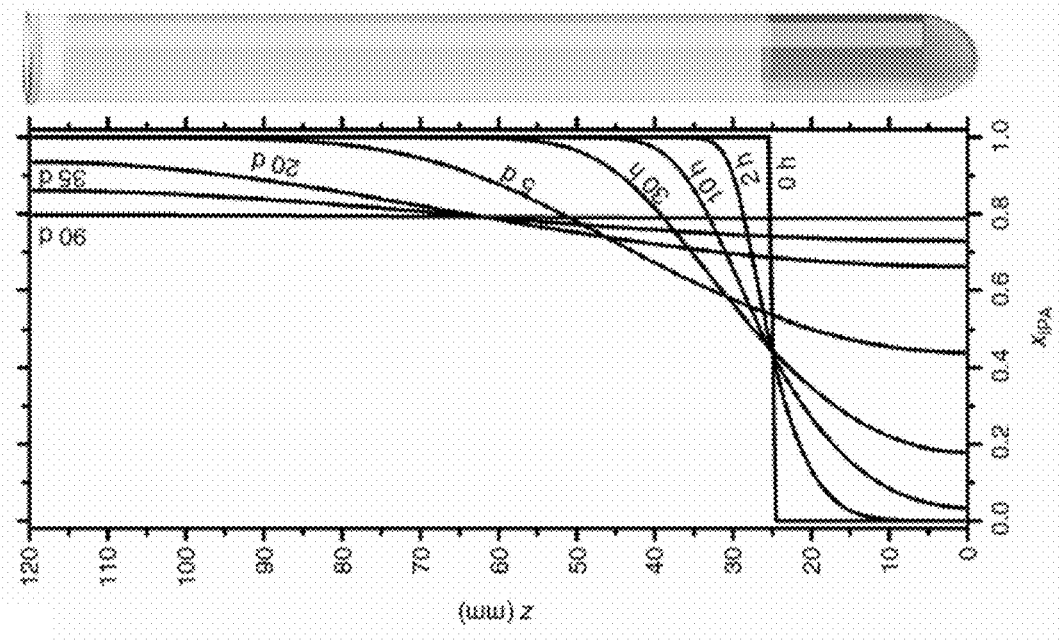
FIGS. 6(*a*)-(*c*) show graphs of simulated solvent composition during counter-diffusion.
Figure 6B:
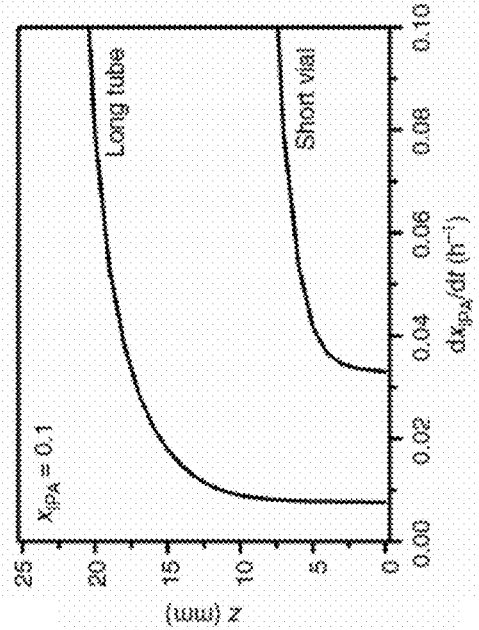
Figure 6C:
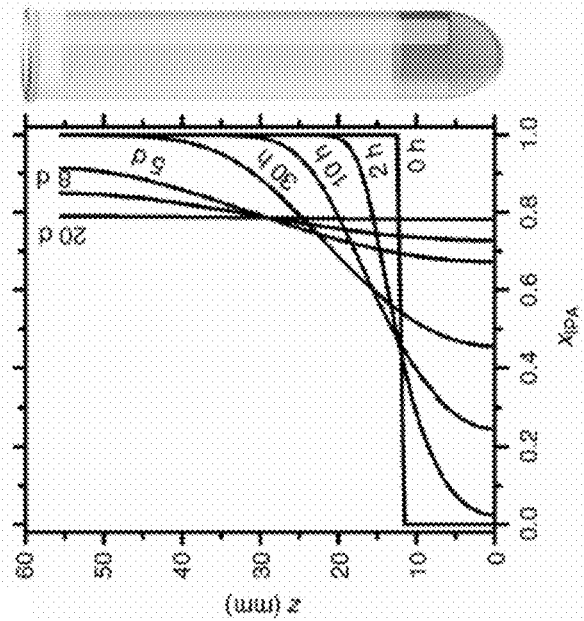

To understand how diffusion speed influences the SC size, the counter-diffusion process was simulated by a two-solvent, one-dimensional diffusion finite element model. The Tyn-Calus method and Chevron mixing rule were used to calculate the average binary diffusivity in the toluene/IPA mixture. See M. T. Tyn and W. F. Calus, *J. Chem. Eng. Data* 20, 106 (1975); and M. R. Riazi and T. E. Daubert, *Ind. Eng. Chem. Res.* 26, 755 (1987). In a typical simulation, a toluene column at bottom and an IPA column on top were initiated with a height ratio of 1:4. The total height of liquid was set to either 56 mm or 120 mm to simulate the fast and slow diffusion scenarios, respectively. FIGS. 6(a) and 6(b) show the evolution of mixture composition $x_{IPA}$ over time for the slow and fast diffusion scenarios, respectively. Three trends consistent with experiments were observed. (1) In both cases, the initial sharp interface gradually blurred. Eventually the systems became a homogeneous solution. (2) The time elapsed in the slow diffusion was approximately four times of the fast case. (3) Slow diffusion displayed a gentler concentration gradient, i.e. $\partial x_{IPA}/\partial z$, which contributed to larger SC sizes by limiting nuclei formation. To quantify the diffusion speed, $\partial x_{IPA} = \partial t_{xIPA=0.1}$ was tracked. According to the aforementioned phase diagram, with $C_{NP,0}=8$ mg/mL, more than 80% of NPs already precipitated when $x_{IPa}$ increased to 0.1. Therefore, this early stage is crucial to the size and quality of SC. On one hand, FIG. 6(c) shows a nearly four times lower speed of composition variation in the slow diffusion case which enables longer relaxation time for NP crystallization. On the other hand, slow diffusion results in a taller bottom region (10 mm vs. 5 mm) with low diffusion speed, providing extra space for large SC formation. It also explained the observation that most SCs were harvested near the bottom of the test tubes.

As a remarkable consequence of the achievement of sub-millimeter-sized SCs, optical characterization was performed on individual SC facets. As shown by FIG. 3(b) and Table 1 the plasmonic peak red-shifted from 529 nm to ~620 nm upon precipitation from solution indicating interparticle coupling induced by significantly reduced interparticle distance. See C. F. Chen et al., *J. Am. Chem. Soc.* 130, 824 (2008); and S. K. Ghosh and Y. Pal, *Chem. Rev.* 107, 4797 (2007). A closer examination revealed that the SC sample displayed a further red-shift from the amorphous film by 7-11 nm as well as broadened peak width. Even more interestingly, a slight difference was identified between two adjacent SC facets. The strength of coupling effect followed the order: film<SC {011}<SC {001} which was attributed to their different surface morphology.

Enhancement of coupling is expected for highly ordered arrays over amorphous stacking of NPs. See D. Wang et al., *ACS Photonics* 2, 1789 (2015). Additionally, the spatial arrangement of NPs at the SC surface could further affect coupling. As illustrated by the insets of FIG. 3(b), a gold NP at the SC {001} facet has 6 nearest neighbors while only 5 for SC {011}. In addition, the higher degree of symmetry of SC {001} could lead to emergence of extra coupling modes which broadens the resonance spectrum, analogous to the mini-band formation in quantum dots. See O. Lazarenkova and A. Balandin, *J. Appl. Phys.* 89, 5509 (2001). Due to the different surface patterns, the NP packing density at SC {011} is 7.2% lower than SC {001} which increases the average interparticle separation from 2.3 nm to 2.5 nm. Such increment has been reported to cause a 2.0% shift of plasmon resonance energy in two-dimensional (2D) hexagonal lattice of large (10.5 nm) gold NPs. See C. F. Chen et al., *J. Am. Chem. Soc.* 130, 824 (2008). As another factor, the perfect planar SC {001} is expected to provide stronger 2D in-plane coupling than the slightly wavy surface of SC {011}. Such a facet-dependent optical property shows that it is more appropriate to treat SCs as anisotropic media and use tensors for their mathematic descriptions rather than scalars, an excellent analogy to traditional crystal optics.

The present invention has been described as a method to synthesize gold nanoparticle supercrystals. It will be understood that the above description is merely illustrative of the applications of the principles of the present invention, the scope of which is to be determined by the claims viewed in light of the specification. Other variants and modifications of the invention will be apparent to those of skill in the art.

We claim:
1. A method to synthesize nanoparticle supercrystals, comprising:
   providing a colloidal suspension of ligand-capped nanoparticles in a non-polar solvent, and
   counter-diffusing the non-polar solvent and a polar anti-solvent into each other to form a solvent/anti-solvent mixture, thereby slowly precipitating nanoparticle supercrystals from the colloidal suspension, wherein the concentration of nanoparticles in the solvent/anti-solvent mixture is greater than 2 mg/mL.
2. The method of claim 1, wherein the nanoparticles comprise metal, semiconductor, or magnetic nanoparticles.
3. The method of claim 2, wherein the nanoparticles comprise gold nanoparticles.
4. The method of claim 2, wherein the nanoparticles comprise Ag, CdSe, PbS, PbSe, FePt, or $Fe_3O_4$ nanoparticles.
5. The method of claim 1, wherein the ligand comprises an alkyl thiol.
6. The method of claim 5, wherein the alkyl thiol comprises dodecanethiol.
7. The method of claim 1, wherein the ligand comprises an alkyl amine or an alkyl acid.
8. The method of claim 1, wherein the non-polar solvent comprises toluene.
9. The method of claim 1, wherein the non-polar solvent comprises hexane, benzene, or xylene.
10. The method of claim 1, wherein the polar anti-solvent comprises isopropanol.
11. The method of claim 1, wherein the polar anti-solvent comprises ethanol, methanol, or tetrahydrofuran.
12. The method of claim 1, wherein the counter-diffusing comprises adding the polar anti-solvent on top of the colloidal suspension and allowing the non-polar solvent and the polar anti-solvent to counter-diffuse into each other.
13. The method of claim 1, wherein the supercrystals are greater than one micrometer in size.
14. The method of claim 1, wherein the supercrystals are greater than ten micrometers in size.
15. The method of claim 1, wherein the supercrystals are greater than one hundred micrometers in size.
16. The method of claim 3, wherein the gold nanoparticles of the supercrystals have a hexagonal close packed meso-structured.
17. The method of claim 3, wherein the supercrystals have a faceted hexagonal disk shape.
18. The method of claim 1, wherein the ligand-capped nanoparticles comprise dodecanethiol-capped gold nanoparticles, the non-polar solvent comprises toluene, and the polar anti-solvent comprises isopropanol, and the concentration in mg/mL of nanoparticles in the toluene/isopropanol mixture is greater than $C_{NP} = 2.0 e^{-3.9 x_{IPA}} - 0.040$, where $x_{IPA}$ is the volume fraction of isopropanol in the mixture.

* * * * *